(12) United States Patent
Hynes et al.

(10) Patent No.: US 6,196,521 B1
(45) Date of Patent: Mar. 6, 2001

(54) FLUID DISPENSING VALVE AND METHOD

(75) Inventors: Anthony Joseph Hynes, Ballston Spa; Richard John Bievenue, Burnt Hills, both of NY (US)

(73) Assignee: Precision Valve & Automation, Inc., Halfmoon, NY (US)

( * ) Notice: Subject to any disclaimer, the term of this patent is extended or adjusted under 35 U.S.C. 154(b) by 0 days.

(21) Appl. No.: 09/136,156

(22) Filed: Aug. 18, 1998

(51) Int. Cl.[7] ................................................ F16K 31/145
(52) U.S. Cl. ............................................ 251/61.1; 251/61
(58) Field of Search ....................... 251/61.1, 61, 61.2, 251/61.3, 61.4

(56) References Cited

U.S. PATENT DOCUMENTS

| | | |
|---|---|---|
| 2,529,028 * | 11/1950 | Landon ........................... 251/61.1 X |
| 2,990,252 * | 6/1961 | Geldern et al. .................. 251/61.1 X |
| 3,312,238 | 4/1967 | Voit, Jr. . |
| 3,653,408 | 4/1972 | Coiner . |
| 3,749,353 * | 7/1973 | Pauliukonis ...................... 251/61.1 |
| 3,802,462 * | 4/1974 | Trosch ............................. 251/61.1 X |
| 4,138,040 | 2/1979 | Stock . |
| 4,168,724 * | 9/1979 | Graffunder et al. ............. 251/61.1 X |
| 4,304,257 | 12/1981 | Webster . |
| 4,529,384 | 7/1985 | Severy . |
| 4,703,913 | 11/1987 | Hunkapiller . |
| 4,848,722 | 7/1989 | Webster . |
| 4,852,851 | 8/1989 | Webster . |
| 4,858,883 | 8/1989 | Webster . |
| 5,090,659 * | 2/1992 | Bronnert ............................ 251/61.1 |
| 5,226,562 | 7/1993 | Kirk . |
| 5,249,745 * | 10/1993 | Bertolotti ............................... 239/76 |
| 5,273,066 | 12/1993 | Graham et al. . |
| 5,456,388 | 10/1995 | Honstein et al. . |
| 5,496,009 | 3/1996 | Farrell et al. . |
| 5,660,370 | 8/1997 | Webster . |

FOREIGN PATENT DOCUMENTS

| | | | |
|---|---|---|---|
| 1947533 * | 3/1971 | (DE) ................................... 251/61.1 |
| 248329 * | 12/1969 | (SU) ................................... 251/61.1 |

* cited by examiner

Primary Examiner—David J. Walczak
(74) Attorney, Agent, or Firm—Schmeiser, Olsen & Watts

(57) ABSTRACT

A valve is provided including a body made of anaerobic, reactive fluid resistant material. The valve also directs pressurized fluid in a substantially planar manner between adjacent port holes on a recessed area of a fluid body section of the valve. The flexible diaphragm can be actuated manually or programmed to dispense pressurized fluid, such as cyanoacrylate fluid. A method of dispensing anaerobic, reactive material is also provided.

20 Claims, 5 Drawing Sheets

FLUID DISPENSING VALVE AND METHOD

BACKGROUND OF THE INVENTION

1. Field of the Invention

The present invention relates to a valve and method useful for dispensing anaerobic, reactive fluids, and in particular, cyanoacrylate fluids.

2. Related Art

As shown by Webster, U.S. Pat. No. 5,660,370, a two port valve is shown having a flexible sheet member. However, the materials of the valve are not such that an anaerobic, reactive fluid such as cyanoacrylate fluid, flowing therethrough would not cure therein. Accordingly, the valve would require disassembly after each use for cleaning and/or maintenance. Further, in Webster, a flexible sheet member is extended into a recess to permit non-planar flow between the two holes on a flat non-flexing sheet member. In order to operate the valve, the combination of a solenoid and a vacuum source is required. Additional variations of valves are shown by Farrell et al., U.S. Pat. No. 4,496,009, and Webster, U.S. Pat. No. 4,848,722, which include a flexible sheet member employing voids at the interface in combination with a vacuum or solenoid to achieve non-planar fluid flow.

Another diaphragm valve is shown by Hunkapiller, U.S. Pat. No. 4,703,913, which forms a fluid tight seal between a valve block and a resilient diaphragm, and uses a vacuum means to lift the diaphragm from the valve block to establish fluid flow. Graham et al., U.S. Pat. No. 5,273,066, incorporates a moisture sensitive material to control the flow of fluid through a valve. Neither reference provide a body made of an anaerobic, reactive fluid resistant material.

From above, there is a need for a valve made of an anaerobic, reactive fluid (e.g., cyanoacrylate fluid) resistant material and one which allows for planar flow of the fluid through the valve.

SUMMARY OF THE INVENTION

In a first general aspect of the present invention is provided a valve having a flexible diaphragm positioned to control fluid flow through a valve body, wherein the valve body is made of an anaerobic, reactive fluid resistant material. This aspect allows proper valving for cyanoacrylate or like fluid with lower maintenance costs and fewer parts. It further provides a valve allowing for planar flow of fluid therethrough.

In a second general aspect in accordance with the present invention is provided a valve having a first body section, a second body section made of an anaerobic, reactive fluid resistant material, and a flexible diaphragm positioned between the first and second body section to control fluid flow through the valve. This aspect provides the same advantages as the first aspect.

In a third general aspect of the present invention is provided a method of dispensing anaerobic, reactive fluids including the steps of providing a fluid dispensing valve having at least a portion thereof made of an anaerobic, reactive fluid resistant material, and dispensing the anaerobic, reactive fluid using the fluid dispensing valve. This aspect provides a method of dispensing cyanoacrylate or like fluid with lower maintenance time and cost.

In a fourth general aspect is provided a fluid dispensing valve having: a fluid body section having a recessed area with adjacent port holes positioned thereon; a retainer block section attached to the fluid body section; a flexible flat substantially uniform diaphragm contained within the recessed area of the fluid body section in interfacial contact with the adjacent port holes positioned thereon; an upper valve cap section having a recessed area and a bias port therein, the upper valve cap section being attached to the retainer block section; and wherein sufficient stress is provided to the periphery of the flexible flat diaphragm to substantially retard the loss of pressurized fluid during pressurized fluid dispensing periods while enabling substantially planar fluid flow between the adjacent port holes positioned on the recessed flat surface of the rigid fluid body section; and means for introducing a fluid through the bias port of the upper valve cap section in a manual or programmed manner to flex or relax the diaphragm, thereby enabling the diaphragm to control substantially planar fluid flow between the adjacent port holes.

The foregoing and other features and advantages of the invention will be apparent from the following more particular description of preferred embodiments of the invention.

BRIEF DESCRIPTION OF THE DRAWINGS

In order that those skilled in the art will be better able to practice the invention, reference will be made to the drawings, wherein.

DETAILED DESCRIPTION OF PREFERRED EMBODIMENTS

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment.

Figure 1:
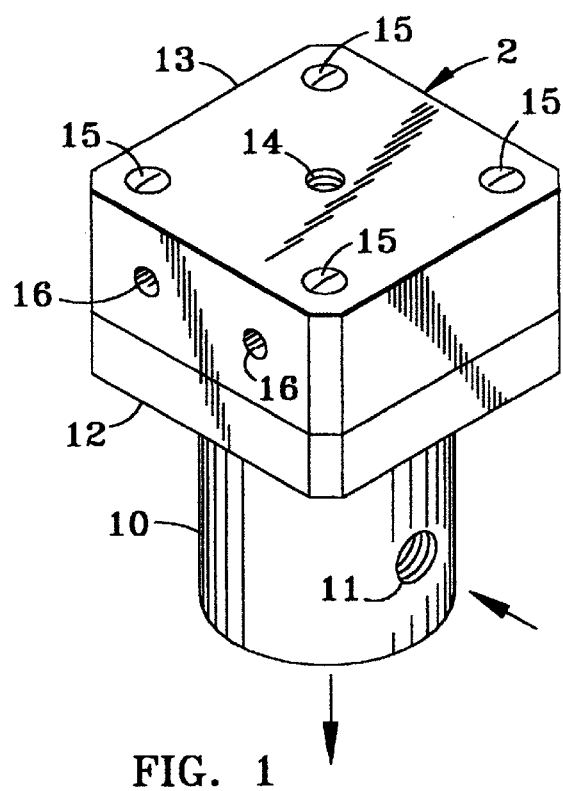
FIG. 1 shows a perspective view of a valve in accordance with the present invention.
Figure 2:
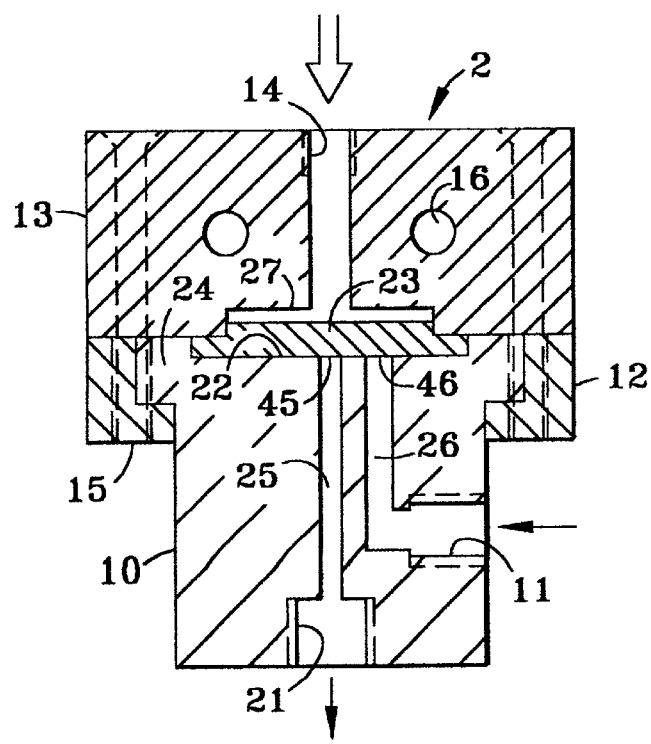
FIG. 2 shows a cross-sectional view of the valve in accordance with the present invention.

FIGS. 1 and 2 show one of the preferred embodiments of a valve 2 in accordance with the present invention. The valve 2 includes an upper valve cap section 13 secured to a fluid body section 10 by a retainer block section 12. The valve 2 is constructed to accommodate anaerobic, reactive fluids, and in particular, cyanoacrylate fluid. Anaerobic, reactive fluids being fluids which can cure in the absence of air. These fluids are typically of low viscosity (<10,000 centipoise). Fluid body section 10 has a fluid entrance port 11 which communicates with a fluid passage 26, and a fluid exit port 21 which communicates with fluid passage 25. While the specific diameters of fluid passages 25, 26 are not critical, effective results can be achieved with a diameter of about 0.079 inches to about 0.100 inches, where the diameter of passage 26 is greater than that of passage 25 to assure planar flow of the fluid between port holes 45, 46. Fluid body section 10 also includes a recessed area 22 at its crown 24 to which fluid passages 25, 26 extend to create adjacent port holes 45, 46, respectively.

Upper valve cap section 13 includes a similar recessed area 27 which faces recessed area 22 to create an opening for a flexible diaphragm 23. The diaphragm 23 can be made from a variety of polymeric materials which preferably are resilient, and which do not exhibit permanent set, i.e., the inability to rebound rapidly after being placed under stress for an extended period of time and recover their original dimensions fully when unstressed. While the diaphragm 23 can be made from anyone of a variety of resilient polymeric materials, a preferred material is a reinforced cured silicone elastomer.

Figure 5:
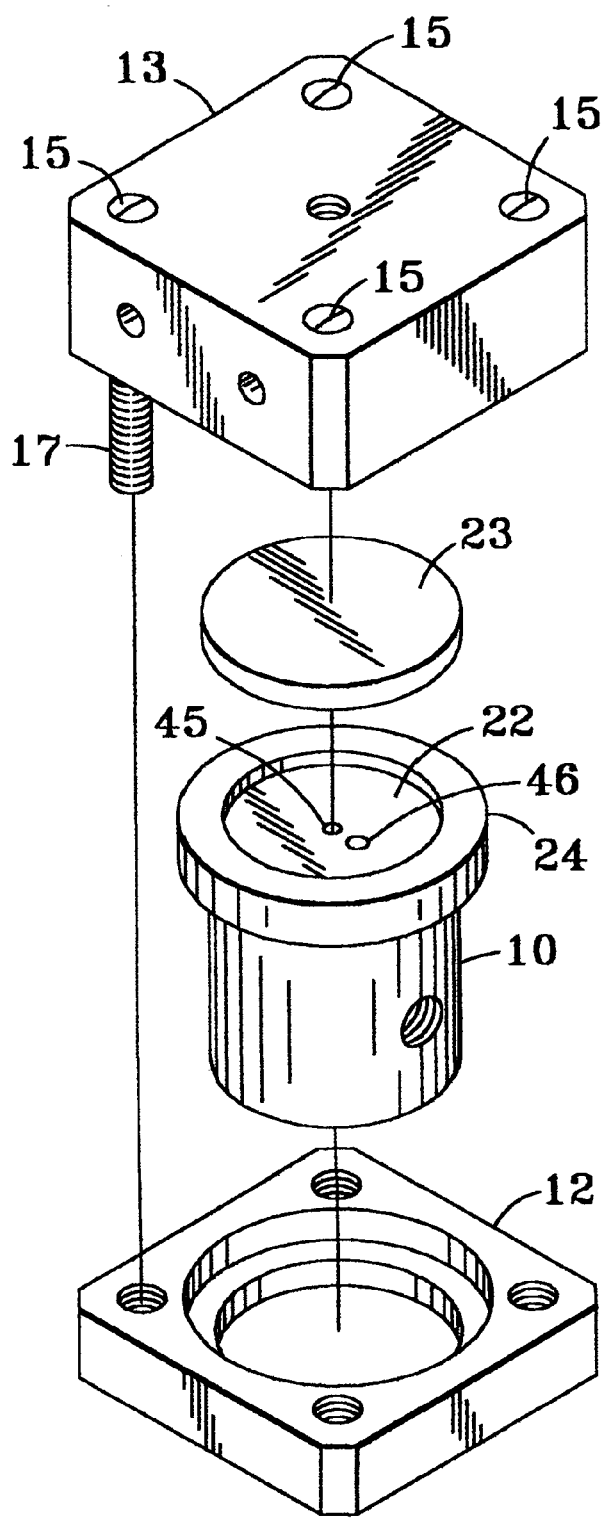
FIG. 5 shows an exploded view of the valve in accordance with the present invention.

As shown in FIG. 5, retainer block section 12 receives fluid body section 10 in a recessed opening therein and is attached to upper valve cap section 13 by screws 15 having threaded sections 17 extending through upper valve cap section 13 into retainer block section 12. Upper valve cap section 13 is securely attached by screws 15 to the retainer block section 12 until surface to surface contact is achieved resulting in a substantial perimeter seal of flexible resilient diaphragm 23. Upper valve cap section 13 also includes mounting holes 16 to mount the valve.

Figure 3:
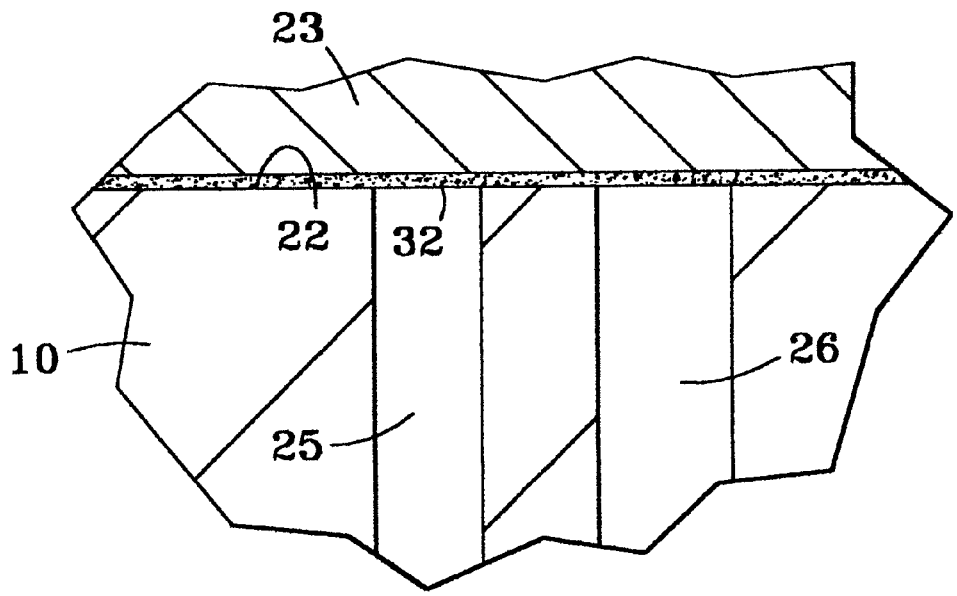
FIG. 3 shows an enlarged cross-sectional view of the diaphragm area of the valve in accordance with the present invention in a closed position.
Figure 4:
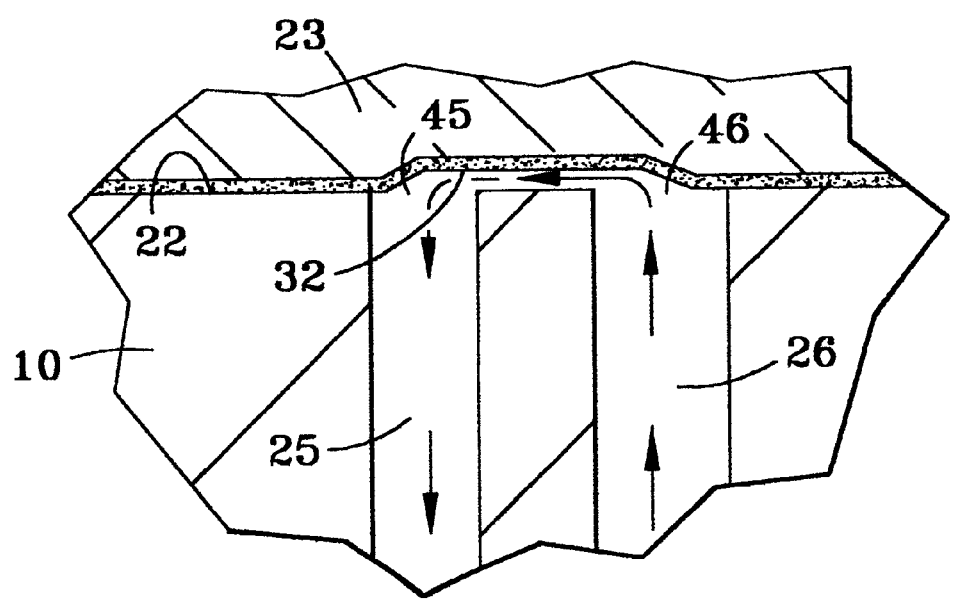
FIG. 4 shows an enlarged cross-sectional view of the diaphragm area of the valve in accordance with the present invention in an open position.

As shown in FIGS. 3 and 4, it has been found that optimum planar flow between port holes 45, 46 can be enhanced by providing a diaphragm having a non-adhesive, chemical resistant surface 32 in contact with recessed area 22. Non-adhesive, chemical resistant surface 32 assures that the anaerobic, reactive fluid does not cure near port holes 45, 46. While various materials are available, a preferred material is Teflon® resin. A preferred diaphragm 23 is a Teflon® resin treated reinforced silicone rubber, which is obtainable from Integrated Liner Technologies, Inc., Latham, N.Y.

Flexible diaphragm 23, as shown in FIG. 2, is in substantially planar contact with fluid body section 10 at recessed area 22 such that the diaphragm closes the adjacent port holes 45, 46 from fluid communication. Upper valve cap section 13 also includes a bias port 14 which communicates with recessed area 27 to supply pressurized fluid, e.g., air or inert gas, to bias the diaphragm 23 to a closed position, i.e., to close the port holes 45, 46 and respective passages 25, 26 from fluid communication.

The perimeter of diaphragm 23 can be pressed by the recessed corner ends of upper valve cap section 13 when upper valve cap section 13 is firmly secured to the retainer block section 12. While the diameter of the diaphragm 23 can substantially correspond to recessed area 22, its thickness can vary between about 1/12 to about 1/8 of its diameter, and preferably about 1/10. Experience has shown that optimum pressurized fluid containment results can be achieved when upper valve cap section 13 is firmly secured to retainer block section 12, and the initial thickness of diaphragm 23 is sufficient to allow for a reduction in diaphragm perimeter thickness in the range of about 10% to about 25%.

In addition to the ultimate reduction in diaphragm perimeter thickness while under stress, consideration also should be directed to the difference in diameters of recess area 22 of fluid body section 10 and recess area 27 of upper valve cap section 13. It has been found that optimum valve performance can be achieved with respect to fluid containment when the recess diameter ratio expressed as A/B, has a value of about 70% to about 85%, where A is the diameter of recess area 27, and B is the diameter of recess area 22. In terms of the actual size of the recess areas 22, 27, recessed area 22 can have a depth of about 0.066 to about 0.084 inches, and a diameter of about 0.75– 3.0 inches, and preferably, about 0.8 to 1.2 inches. The recessed area 27 can have a diameter of about 0.72 to about 0.88 inches, and a depth of about 0.040 to about 0.125 inches.

In determining which factors are significant for achieving planar fluid flow between port holes 45, 46, consideration can be given to the unstressed thickness of diaphragm 23, referred to hereinafter as "T" and the total vertical displacement potential referred to hereinafter as "D", which is equal to the sum of the depths of recess area 22 and recess area 27. Effective planar flow can be achieved when T/D has a value of about 0.5 to about 0.85, and preferably about 0.75.

Returning to FIGS. 3 and 4, enlarged cross-sectional views of the diaphragm 23 in closed, FIG. 3, and open, FIG. 4, positions are shown. In an open position, the pressure on the diaphragm 23 through bias port is preferably removed, thus allowing the diaphragm 23 to be lifted by the pressure of the fluid flowing through passages 25, 26. Alternatively, the biasing pressure supplied via bias port 14 may be maintained and the fluid pressure fluctuated to overcome it. Preferably, however, a vacuum is not applied to the diaphragm 23. FIG. 4 also illustrates the substantially planar flow of pressurized fluid across the interface between adjacent port holes 45, 46.

It is an advantage of the present invention that fluid body section 10 is preferably made from an inert, light, machinable material that is anaerobic, reactive fluid resistant. The material may be a thermoplastic or thermosetting material. Among the materials which can be used, is a linear polyoxymethylene-type acetal resin, for example, Delrin® resin. An additional material that can be used is Ultem® polyetherimide. Teflon® is also a possible material.

Upper valve cap section 13, and retainer block section 12 can be made from any suitable rigid, inert, metallic or non-metallic material. Some of these rigid materials can be machinable, or moldable and include, for example, thermoplastic, thermosetting, or metallic materials. More specifically, the materials may be polycarbonate, an acrylic resin, such as Lucite® resin, aluminum, steel, or magnesium.

While the specific dimensions of the particular valve sections 10, 12, and 13 are not critical, a typical size for the diameter of fluid body section 10 can be about 1 to about 2 inches. Retainer block 12 can be, for example, about 0.375 inch×1.750 inch×1.750 inches. Upper valve cap 13 can be about 0.750 inch×1.750 inch×1.750 inches.

Figure 6:
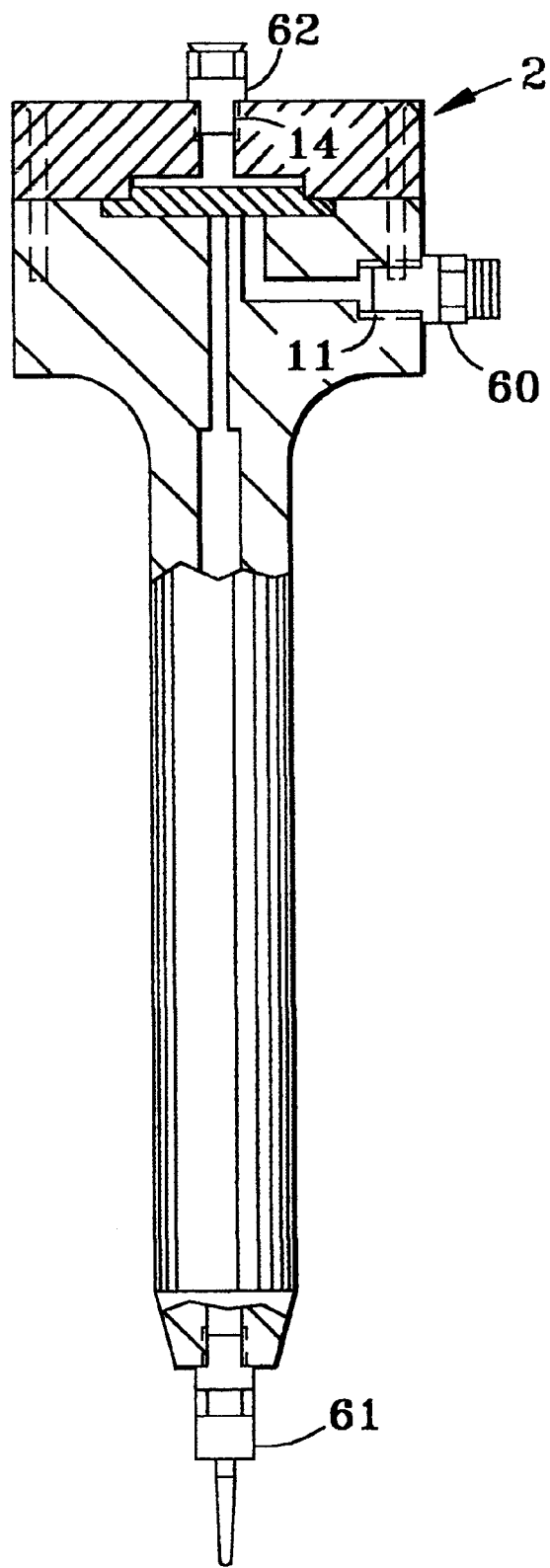
FIG. 6 shows a cross-sectional view of a hand held valve in accordance with the present invention.

Turning to FIG. 6, fluid entrance port 11 of fluid body section 10 can be typically about ¼ inches diameter, sufficient to accommodate a male or female luer lock 60. Port hole 14 accommodates a connecting lock 62 which typically receives a 5/32 to ¼ inch diameter flexible tube. FIG. 6 also shows an alternative shape of the pressurized fluid valve 2 of the invention. In this alternative, the valve 2 can be manually held. Activation of the valve can be by the use of a foot actuator (not shown).

Figure 7:
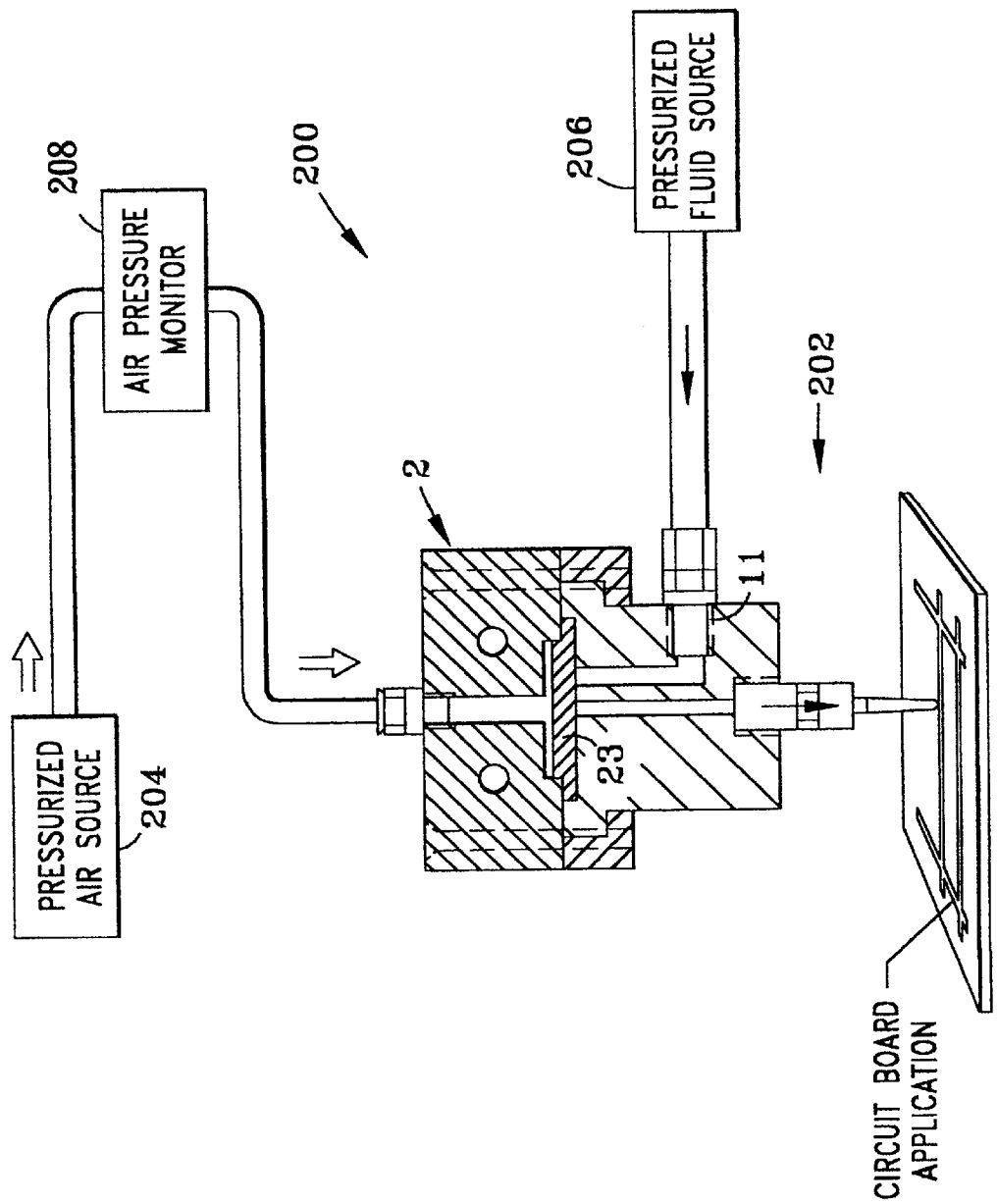
FIG. 7 shows a valve system in accordance with the present invention.

Referring to FIG. 7, there is illustrated a fluid dispensing system 200 in accordance with the invention and which can be used to more fully understand the operation of valve 2. Valve 2 can be mounted within, for example, a circuit board application work station 202. In operation, diaphragm 23 of valve 2 is pressurized with air, or an inert gas, from a source 204 at pressures of from about 35 psi to about 100 psi. An anaerobic, reactive fluids, e.g., cyanoacrylate or like fluid, is supplied from a pressurized fluid source 206 to fluid entrance port 11 at pressures from about 1 psi to about 60 psi depending on the fluid viscosity of the fluid. The fluid viscosity can range between 1 to about 10,000 centipoise. An air pressure monitor 208 in the form such as a model ST 100 Shot Timer of Precision Valve & Automation Inc., Latham N.Y., is operated manually or programmed to depressurize diaphragm 23 by use of a solenoid to allow flow of fluid through valve 2 in a substantially planar manner. Interruption of fluid flow is effected by restoring a pressure differential of at least 30 psi on diaphragm 23 above the incoming fluid pressure. When pressurized fluid flow into valve 2 is externally terminated, a pressure of at least 30 psi can be applied onto the diaphragm to seal valve 2. It is also possible that the biasing pressure on diaphragm 23 via bias port 14 may be held steady while the pressure of the fluid is varied to overcome the biasing pressure.

While rate of fluid flow through valve 2 is dependent on such factors as fluid viscosity, external fluid pressure, and valve geometry, the regulation of fluid flow in a substantially planar manner can be effected manually, or in a programmed mode. For example, if a particular fluid pressure is used, an appropriate air or an inert gas pressure can be selected to pressurize diaphragm 23 to effect a fluid-air pressure differential allowing or interrupting fluid flow.

When valve usage has been terminated, the adjacent port holes 45, 46 at recessed area 22 can be sealed by pressurizing diaphragm 23 to an appropriate level with air or inert gas. As a result, possible adverse effects resulting from exposure of reactive fluid to ambient atmospheric conditions can be minimized.

Last, the present invention also includes a method of dispensing anaerobic, reactive fluids including providing a fluid dispensing valve having at least a portion thereof made of a anaerobic, reactive fluid resistant material, and dispensing the anaerobic, reactive fluid using the fluid dispensing valve. This aspect provides a method of dispensing cyanoacrylate fluid with lower maintenance time and cost.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A valve comprising:
   a valve body; and
   a diaphragm positioned to control fluid flow through the valve body, wherein the diaphragm is formed of a resilient material, which does not have permanent set and a non-adhesive material, which does not cure an anaerobic, reactive fluid; and wherein the valve body is made of an anaerobic, reactive fluid resistant material.

2. The valve of claim 1, wherein the anaerobic, reactive fluid is chosen from the group consisting of: cyanoacrylate fluid and silicone.

3. The valve of claim 1, wherein the diaphragm resilient material comprises silicone rubber.

4. The valve of claim 1, wherein the anaerobic reactive fluid resistant material is chosen from the group consisting of: linear polyoxymethylene acetal resin and polyetherimide.

5. The valve of claim 1, further comprising:
   a retainer block operatively engaging the valve body; and
   a valve cap operatively coupled to the retainer block and including a port in fluid communication with the diaphragm.

6. The valve of claim 1, wherein the valve body includes two passages extending therethrough, and wherein the diaphragm controls fluid communication between the two passages.

7. A valve comprising;
   a first body section;
   a second body section made of an anaerobic, reactive fluid resistant material;
   a diaphragm positioned between the first and second body section to control fluid flow through the valve;
   wherein the diaphragm is formed of a resilient material and which does not have permanent set and a non-adhesive material which does not cure the anaerobic reactive fluid.

8. The valve of claim 7, wherein the anaerobic, reactive fluid is cyanoacrylate fluid.

9. The valve of claim 7, wherein the first and second body sections each include a recess in which the diaphragm is positioned.

10. The valve of claim 7, further comprising an air passage in the first body section for pressurizing the diaphragm.

11. The valve of claim 7, further comprising a pair of passages in the second body section for allowing fluid flow, and wherein the diaphragm controls fluid communication between the pair of passages.

12. The valve of claim 7, wherein the diaphragm is a reinforced cured silicone elastomer.

13. The valve of claim 7, wherein the non-stick surface is polytetrafluoroethylene resin.

14. The valve of claim 7, further comprising a third body section coupling the first and second body sections together.

15. A method of dispensing anaerobic, reactive fluids comprising the steps of:
   providing a fluid dispensing valve having at least a portion thereof made of an anaerobic, reactive fluid resistant material;
   providing a diaphragm to control fluid flow through the fluid dispensing valve; and wherein the diaphragm is formed of a resilient material and which does not have permanent set and a non-adhesive material which does not cure the anaerobic, reactive fluid; and
   dispensing the anaerobic, reactive fluid onto a surface using the fluid dispensing valve.

16. The method of claim 15, wherein the anaerobic, reactive fluid is cyanoacrylate fluid.

17. A fluid dispensing valve comprising:
   a fluid body section having a recessed area with adjacent port holes positioned thereon;
   a retainer block section attached to the fluid body section;
   a flat substantially uniform diaphragm contained within the recessed area of the fluid body section in interfacial contact with the adjacent port holes positioned thereon;
   an upper valve cap section having a recessed area and a bias port therein, the upper valve cap section being attached to the retainer block section; and wherein sufficient stress is provided to the periphery of the flat diaphragm to substantially retard the loss of pressurized fluid during pressurized fluid dispensing periods while enabling substantially planar fluid flow between the adjacent port holes positioned on the recessed flat surface of the rigid fluid body section;

means for introducing a biasing fluid through the bias port of the upper valve cap section in a manual or programmed manner is to flex or relax the diaphragm, thereby enabling the diaphragm to control substantially planar fluid flow between the adjacent port holes;

wherein the flat diaphragm is formed of a resilient material which does not have permanent set and a non-adhesive material which does not cure an anaerobic, reactive fluid; and wherein fluid flowing through the adjacent port holes is directed onto a surface.

18. The fluid dispensing valve of claim 17, wherein the flat diaphragm first material is a reinforced silicone rubber, arid the flat diaphragm second material is a polytetrafluoroethylene resin coating over the first material.

19. The fluid dispensing valve of claim 17, wherein the fluid is an anaerobic, reactive fluid.

20. The fluid dispensing valve of claim 17, wherein the fluid body section is made from an anaerobic, reactive fluid resistant material.

* * * * *